(No Model.)

W. TATTERSALL.
APPARATUS FOR HUMIDIFYING AIR.

No. 445,094. Patented Jan. 20, 1891.

Witnesses:
E. C. Duffy.
H. E. Peck

Inventor,
Wm. Tattersall
per O. E. Duffy
Attorney

UNITED STATES PATENT OFFICE.

WILLIAM TATTERSALL, OF BRADFORD, ENGLAND.

APPARATUS FOR HUMIDIFYING AIR.

SPECIFICATION forming part of Letters Patent No. 445,094, dated January 20, 1891.

Application filed May 2, 1890. Serial No. 350,307. (No model.)

*To all whom it may concern:*

Be it known that I, WILLIAM TATTERSALL, a subject of the Queen of England, residing at Bradford, England, have invented certain new and useful Improvements in Apparatus for Humidifying Air or Imparting Moisture thereto, of which the following is a specification.

This invention relates to improvements in apparatus for humidifying or imparting moisture to the air of factories, mills, and other places; and its object is to distribute the moisture in a more finely-divided state than heretofore.

The said improvements consist in employing what is hereinafter termed a "pulverizing-disk," so arranged in connection with an ordinary spray-producing apparatus that as the spray is formed it strikes or impinges against said disk and rebounds therefrom in a pulverized state or subdivided into minute atoms, which readily remain suspended in the air.

Figure 1:
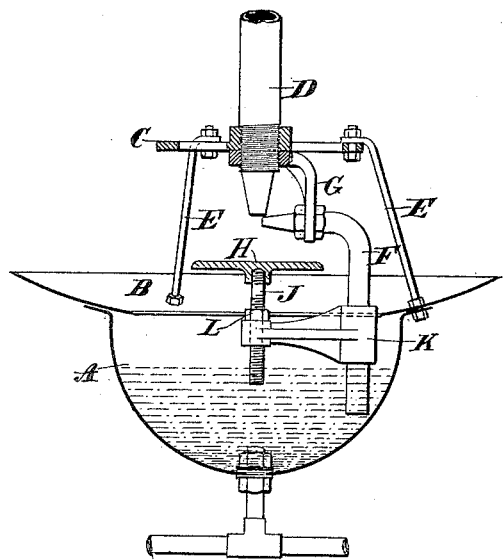
Figure 2:
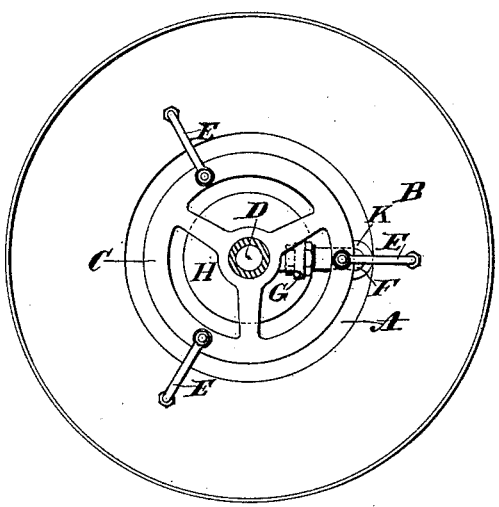
Figure 3:
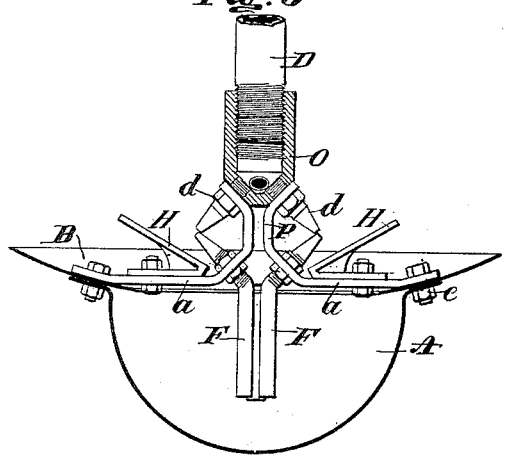
Figure 4:
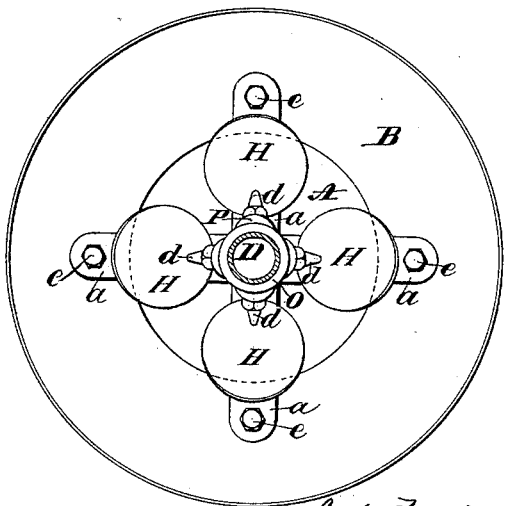

In the accompanying drawings, Figure 1 represents a simple form of spray-producing apparatus in vertical section with my improvements applied thereto. Fig. 2 is a plan view of the same. Fig. 3 is a vertical section of a compound spraying apparatus provided with my improvements, and Fig. 4 is a plan view of the same.

Similar letters of reference indicate corresponding parts in each of the figures.

The water-vessel A in Figs. 1 and 2, provided with a rim B, is suspended from the plate C, screwed to the air-pipe D by the rods E E E, and the spray-pipe F dips down into said vessel with the upper end curved so as to meet the orifice of the pipe D, to which it is rigidly connected by G in a similar manner to spraying apparatus of ordinary type. A disk H, preferably adjustable in relation to the orifice of the air-pipe, is mounted on the screwed rod J, fitting the bracket K, projecting from the pipe F, and a lock-nut L is provided to fix the rod J after adjustment.

In operation the air rushing from the air-pipes draws the water from the cistern through the spray-pipes, dispersing it in the form of spray in a similar manner to an ordinary spray-producer; but such spray striking or impinging against said pulverizing-disk is completely pulverized and thrown off such disk on all sides in a most finely-divided state, so that it is carried away by the air without condensing in drops.

In the compound spraying apparatus represented in Figs. 3 and 4 the air-pipe D is closed below by the cap O, provided with four nipples or nozzles *d*, projecting at an angle therefrom. The attachment P, connected to the cap O by said nipples, spreads out below into four arms *a*, one beneath each nipple *d*, and the cistern A and rim B are supported from their outer ends by the bolts *e*. A spray-pipe F is passed through and connected to each arm, arranged to meet each nipple *d* at a suitable angle for producing spray, and pulverizing-disks H are also mounted upon each arm *a*, preferably at a slight angle to the spray-pipes, so as to direct the spray away from the apparatus. The said air-pipes are supplied with air at a suitable pressure, which affords ready means of providing fresh heated or cooled air, as may be required. The said water-vessels are fed in any convenient manner, and it is obvious that two or more spraying apparati may be arranged with the water-vessels connected by pipes to and fed from a common cistern, in which the level of the water is controlled by a ball-cock.

I claim—

The herein-described apparatus, consisting in the combination of the depending air-pipe having an open nozzle on its end, a water-supply vessel, means suspending said vessel from said pipe beneath the nozzle thereof, an open water-tube having its lower open end extending into the water in said vessel and its outer end bent and provided with a nozzle having its mouth close and at an angle to the nozzle of said air-pipe, the rigid disk opposite said air-nozzle, and means to support said water-tube.

In testimony whereof I have hereunto set my hand in the presence of the two subscribing witnesses.

WILLIAM TATTERSALL.

Witnesses:
   DAVID NOWELL,
   WILLIAM NEWTON WESTON.